Patented Mar. 10, 1936

2,033,421

UNITED STATES PATENT OFFICE 2,033,421

FLOOR COVERING COMPOSITION

Ernst Eichert, Weinsberg, Germany, assignor of one-half to Martin Weger, Schweinfurt-on-the-Main, Germany No Drawing. Application November 7, 1933, Serial No. 697,082. In Germany November 17, 1932

3 Claims. (Cl. 106—34)

The subject matter of the present invention relates to a composition of matter for the production of masses of stone wood, especially such masses as are employed for floor covering. It is known that such coverings are for a great part prepared with magnesium chloride solution and similar substances. However, these substances have the disadvantage that they not only attack and destroy the metal parts in the plaster floor but they are also the cause of such floors very readily becoming damp or cracking and rising.

Now these disadvantages are remedied by the present invention, according to which there is added to a mixture of plaster of Paris and sawdust or cork as filling material a certain percentage of a mass consisting of about 10% of sodium thio-sulphate and 90% of calcium carbonate. The mixture is prepared only with water. It gives a very uniform but porous covering which is not only quite inert in its behaviour to metal parts but is also cheap to produce and, owing to the filling material consisting of cork and sawdust, has proved to be especially heat-retaining and sound-deadening. The costs of transport of the constituents, which are only mixed together at the place at which the product is used, are cheapened, especially as only water is employed for preparing the mass. A further advantage of this mass is to be seen in the fact that the floor that is covered with it can be very soon walked on. It has been found by experiments that ordinary floors require a drying period of 14 days, whereas a floor made of a mass according to the present invention can be walked on after three days. It is further pointed out that this mass can be employed not only as a floor covering but also as wall plaster work or wall plates or wall covering.

The subject matter of the invention is more fully explained with the aid of the following example.

5 parts of plaster of Paris and 4 parts of sawdust or cork or a similar filling material are mixed together. To this mixture there is added one part of a mixture which consists of 90% of calcium carbonate and 10% of sodium thiosulphate. The whole is prepared for use with water.

The calcium carbonate is added to the sodium thio-sulphate merely to prevent it from caking into a hard crystalline mass, thus permitting thiosulphate to be stored and transported in loose ground condition ready for mixing with the plaster of Paris and filler.

What I claim and desire to secure by Letters Patent of United States is:—

1. A composition of matter particularly for use as a floor covering comprising a mixture consisting of a filling material, plaster of Paris, and sufficient sodium thiosulphate rendered non-caking by admixture with calcium carbonate to render the plaster of Paris a more effective binder for the filler.

2. A composition of matter according to claim 1, in which the proportions are as follows:

| | Parts |
|---|---|
| Plaster of Paris | 5 |
| Filling material | 4 |
| Sodium thiosulphate and calcium carbonate | 1 |

3. A composition of matter according to claim 1, in which the proportions are as follows:

| | Percent |
|---|---|
| Plaster of Paris | 50 |
| Filling material | 40 |
| Calcium-carbonate | 9 |
| Sodium thiosulphate | 1 |

ERNST EICHERT.